(12) United States Patent
Shinohara et al.

(10) Patent No.: US 12,177,602 B2
(45) Date of Patent: Dec. 24, 2024

(54) LIGHT-FOLDED PROJECTOR

(71) Applicant: Apple Inc., Cupertino, CA (US)

(72) Inventors: Yoshikazu Shinohara, Cupertino, CA (US); Takeyoshi Saiga, Tokyo (JP); Ligang Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 385 days.

(21) Appl. No.: 17/677,882

(22) Filed: Feb. 22, 2022

(65) Prior Publication Data

US 2022/0268976 A1     Aug. 25, 2022

Related U.S. Application Data

(60) Provisional application No. 63/152,550, filed on Feb. 23, 2021.

(51) Int. Cl.
| | |
|---|---|
| *G02B 26/08* | (2006.01) |
| *G03B 21/28* | (2006.01) |
| *H04N 5/33* | (2023.01) |
| *G03B 17/54* | (2021.01) |
| *G06F 1/16* | (2006.01) |

(52) U.S. Cl.
CPC ............... *H04N 5/33* (2013.01); *G03B 21/28* (2013.01); *G03B 17/54* (2013.01); *G06F 1/1686* (2013.01)

(58) Field of Classification Search
CPC .......... H04N 5/33; H04N 23/20; G03B 21/28; G03B 17/54; G06F 1/1686; G06F 1/1626; G06F 1/1637; G02B 5/04; G02B 26/08; H04M 1/0272; H04M 1/0264
See application file for complete search history.

(56) References Cited

U.S. PATENT DOCUMENTS

| | | | |
|---|---|---|---|
| 6,636,356 B2 | 10/2003 | Takeyama | |
| 9,557,630 B1 | 1/2017 | Marason et al. | |
| 9,621,773 B2 | 4/2017 | Kettumen et al. | |
| 2002/0039232 A1 | 4/2002 | Takeyama | |
| 2013/0100413 A1 | 4/2013 | Shina | |

(Continued)

FOREIGN PATENT DOCUMENTS

| | | |
|---|---|---|
| CN | 104049720 | 11/2017 |
| CN | 107580165 | 1/2018 |

(Continued)

OTHER PUBLICATIONS

Evaluation Report (including English translation) from Chinese Application No. 202220370026.5, dated Dec. 19, 2022, pp. 1-15.

(Continued)

*Primary Examiner* — Euncha P Cherry
(74) *Attorney, Agent, or Firm* — Robert C. Kowert; Kowert, Hood, Munyon, Rankin & Goetezel, P.C.

(57) ABSTRACT

A device may include a light-folded projector that may include an infrared (IR) light emitter and a light folding element. The light folding element may receive IR light emitted from the IR light emitter and fold the IR light one or more times to guide the IR light passing through the light folding element to exit the device to an environment. The device may also include a detector that may detect and/or recognize an object in the environment using the IR light from the light-folded projector, and a front-facing camera to capture images of the environment in front of the device.

20 Claims, 28 Drawing Sheets

(56) References Cited

U.S. PATENT DOCUMENTS

| | | | |
|---|---|---|---|
| 2013/0329397 A1 | 12/2013 | Shimizu et al. | |
| 2016/0006913 A1 | 1/2016 | Kettunen | |
| 2022/0091373 A1* | 3/2022 | Saiga | G02B 13/0035 |
| 2022/0091398 A1* | 3/2022 | Smyth | G03B 3/04 |

FOREIGN PATENT DOCUMENTS

| | | |
|---|---|---|
| CN | 108040150 | 5/2018 |
| CN | 108780210 | 11/2018 |
| CN | 108828612 A | 11/2018 |
| CN | 208569285 | 3/2019 |
| CN | 111290667 | 6/2020 |
| CN | 111552066 | 8/2020 |

OTHER PUBLICATIONS

Office Action from Chinese Application No. 202210167447.2, dated Sep. 20, 2024, pp. 1-7.

\* cited by examiner

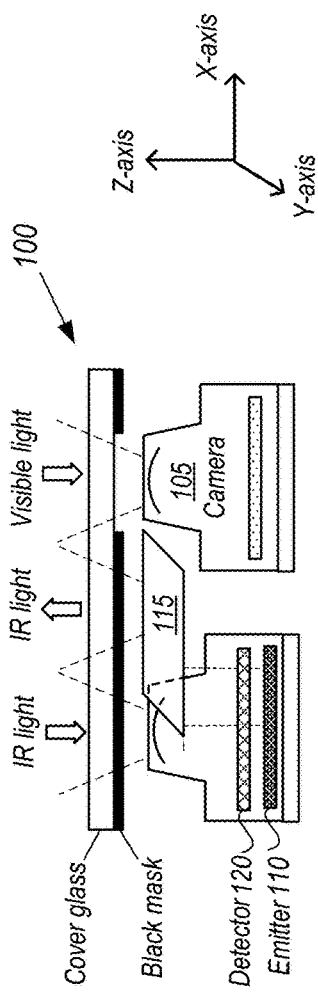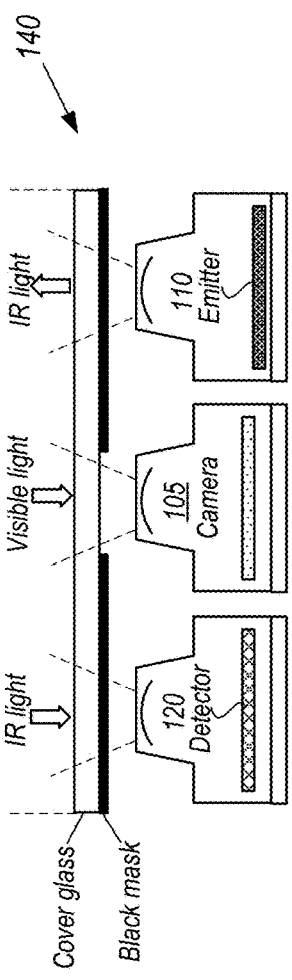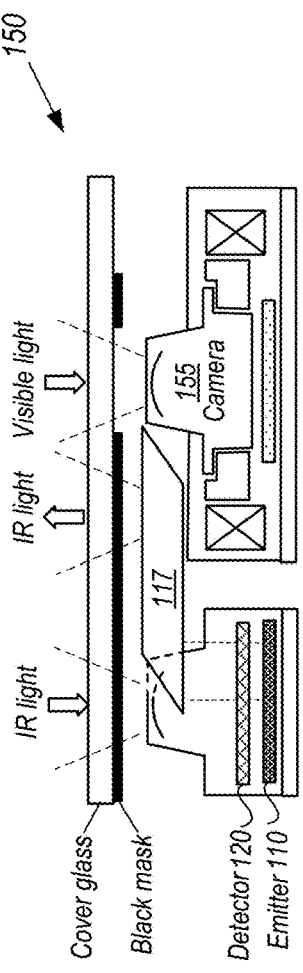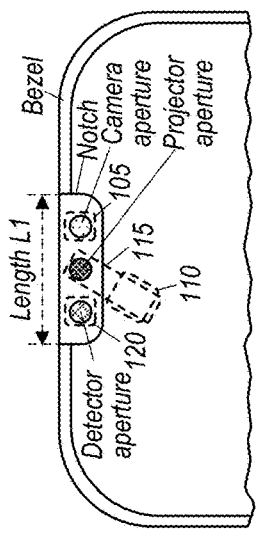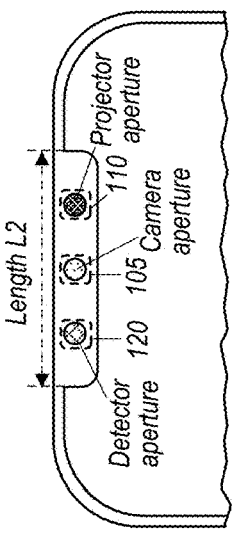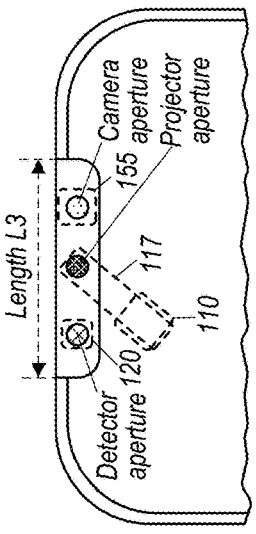
FIG. 1A
FIG. 1B
FIG. 1C

| K | G3S1 | G3S2 | G3S3 | G3S4 | G2S1 | G2S2 | G1S1 |
|---|---|---|---|---|---|---|---|
| | -1.21E+01 | -3.84E+00 | -7.34E+00 | 2.61E-01 | -6.54E-01 | -1.20E+00 | -2.04E+00 |
| A, 4th | -2.84E-01 | -1.57E-01 | 1.46E-01 | 7.27E-02 | 7.53E-02 | -2.07E-02 | -2.68E-03 |
| B, 6th | 5.61E-01 | 2.57E-01 | -2.13E-01 | 8.14E-02 | -3.74E-03 | -7.14E-03 | 3.33E-05 |
| C, 8th | -3.97E-01 | -1.37E-01 | 1.15E-01 | -1.91E-01 | -1.48E-02 | -1.03E-03 | 5.47E-05 |
| D, 10th | 0.00E+00 | 0.00E+00 | -2.08E-02 | 9.03E-02 | 3.82E-02 | 6.37E-03 | 0.00E+00 |

FIG. 2B

| Segment | Radius | Thickness | Angle | Lens index | Abbe number |
|---|---|---|---|---|---|
| 1 | 0 | 0.534 | | | |
| 2 | 1.038 | 0.350 | | 1.634 | 20.35 |
| 3 | 0.495 | 0.230 | | | |
| 4 | 1.052 | 0.704 | | 1.634 | 20.35 |
| 5 | -3.022 | 0.331 | | | |
| 6 | -1.035 | 0.602 | | 1.634 | 20.35 |
| 7 | -1.293 | 0.100 | | | |
| 8 | 0 | 0 | | | |
| 9 | 0 | 0.820 | | 1.928 | 24.11 |
| 10 | 0 | -1.640 | 30 | 1.928 | 24.11 |
| 11 | 0 | 3.080 | 60 | 1.928 | 24.11 |
| 12 | 0 | -1.640 | 60 | 1.928 | 24.11 |
| 13 | 0 | 0.820 | 30 | 1.928 | 24.11 |
| 14 | 0 | 0.166 | | 1.506 | 56.56 |
| 15 | -4.283 | 0.100 | | | |
| 16 | 0 | 0.200 | | 1.451 | 67.80 |
| Sto | 0 | 600 | | | |

*FIG. 2C*

| K | G3S1 | G3S2 | G2S1 | G2S2 | G1S1 |
|---|---|---|---|---|---|
| A, 4th | 4.10E+00 | -1.66E+00 | -1.02E+00 | -1.90E+00 | -3.28E+00 |
| B, 6th | 7.71E-02 | 1.11E-01 | 3.10E-01 | -1.68E-02 | -6.90E-03 |
| C, 8th | 5.35E-02 | 6.96E-03 | -2.50E-01 | 1.02E-04 | 4.02E-04 |
| D, 10th | 1.64E-01 | 8.40E-02 | 6.29E-02 | -8.61E-03 | -8.93E-06 |
| | -3.84E-01 | -5.65E-02 | 1.99E-01 | 1.05E-02 | 0.00E+00 |

FIG. 4B

| Segment | Radius | Thickness | Angle | Lens index | Abbe number |
|---|---|---|---|---|---|
| 1 | 0 | 0.71 | | | |
| 2 | -9.845 | 0.582 | | 1.634 | 20.35 |
| 3 | -1.031 | 0.244 | | | |
| 4 | -0.638 | 0.739 | | 1.634 | 20.35 |
| 5 | -1.246 | 0.16 | | | |
| 6 | 0 | 0 | | | |
| 7 | 0 | 0.82 | | 1.928 | 24.11 |
| 8 | 0 | -1.64 | 30 | 1.928 | 24.11 |
| 9 | 0 | 3.08 | 60 | 1.928 | 24.11 |
| 10 | 0 | -1.64 | 60 | 1.928 | 24.11 |
| 11 | 0 | 0.82 | 30 | 1.928 | 24.11 |
| 12 | 0 | 0.213 | | 1.506 | 56.56 |
| 13 | -3.799 | 0.1 | | | |
| 14 | 0 | 0.2 | | 1.451 | 67.8 |
| Sto | 0 | 600 | | | |

FIG. 4C

| K | G3S1 | G3S2 | G3S3 | G3S4 | G2S1 | G2S2 | G1S1 |
|---|---|---|---|---|---|---|---|
| A, 4th | -1.02E+01 | -3.12E+00 | -6.43E+00 | -2.15E+00 | -8.63E-01 | -1.34E+00 | -2.08E+00 |
| B, 6th | -6.14E-01 | -3.86E-01 | 1.83E-01 | 6.85E-02 | 1.47E-01 | -1.45E-02 | -2.33E-03 |
| C, 8th | 1.06E+00 | 5.01E-01 | -4.70E-01 | 1.27E-01 | 4.49E-04 | -3.41E-03 | 2.03E-05 |
| D, 10th | -6.74E-01 | -2.19E-01 | 5.12E-01 | -2.35E-01 | -1.12E-01 | -1.46E-02 | 4.74E-05 |
| | 0.00E+00 | 0.00E+00 | -2.43E-01 | 9.27E-02 | 1.11E-01 | 1.32E-02 | 0.00E+00 |

FIG. 5B

| Segment | Radius | Thickness | Angle | Lens index | Abbe number |
|---|---|---|---|---|---|
| 1 | 0 | 0.5 | | | |
| 2 | 1.61 | 0.35 | | 1.634 | 20.35 |
| 3 | 0.587 | 0.148 | | | |
| 4 | 1.114 | 0.78 | | 1.634 | 20.35 |
| 5 | -1.621 | 0.3 | | | |
| 6 | -0.831 | 0.564 | | 1.634 | 20.35 |
| 7 | -1.193 | 0.1 | | | |
| 8 | 0 | 0 | | | |
| 9 | 0 | 0.82 | | 1.928 | 24.11 |
| 10 | 0 | -1.64 | 30 | 1.928 | 24.11 |
| 11 | 0 | 3.08 | 60 | 1.928 | 24.11 |
| 12 | 0 | -1.64 | 60 | 1.928 | 24.11 |
| 13 | 0 | 0.82 | 30 | 1.928 | 24.11 |
| 14 | 0 | 0.1 | | | |
| 15 | 0 | 0.414 | | 1.536 | 55.98 |
| 16 | -4.534 | 0.1 | | | |
| 17 | 0 | 0.2 | | 1.451 | 67.8 |
| Sto | 0 | 600 | | | |

FIG. 5C

| K | G3S1 | G3S2 | G2S1 | G2S2 | G1S1 |
|---|---|---|---|---|---|
| A, 4th | 4.17E+00 | -2.03E+00 | -9.59E-01 | -1.44E+00 | -2.90E+00 |
| A, 4th | 8.90E-02 | 8.86E-02 | 2.56E-01 | -1.41E-02 | -4.35E-03 |
| B, 6th | 3.25E-01 | 2.49E-01 | -3.79E-02 | -9.14E-03 | 2.55E-04 |
| C, 8th | -1.67E-01 | 6.11E-02 | -3.31E-01 | -1.61E-02 | -2.86E-05 |
| D, 10th | -2.65E-01 | -2.00E-01 | 4.15E-01 | 9.53E-03 | 0.00E+00 |

FIG. 6B

| Segment | Radius | Thickness | Angle | Lens index | Abbe number |
|---|---|---|---|---|---|
| 1 | 0 | 0.71 | | | |
| 2 | -5.209 | 0.527 | | 1.634 | 20.35 |
| 3 | -1.057 | 0.258 | | | |
| 4 | -0.71 | 0.807 | | 1.634 | 20.35 |
| 5 | -1.302 | 0.1 | | | |
| 6 | 0 | 0 | | | |
| 7 | 0 | 0.82 | | 1.928 | 24.11 |
| 8 | 0 | -1.64 | 30 | 1.928 | 24.11 |
| 9 | 0 | 3.08 | 60 | 1.928 | 24.11 |
| 10 | 0 | -1.64 | 60 | 1.928 | 24.11 |
| 11 | 0 | 0.82 | 30 | 1.928 | 24.11 |
| 12 | 0 | 0.1 | | | |
| 13 | 0 | 0.419 | | 1.536 | 55.98 |
| 14 | -4.235 | 0.1 | | | |
| 15 | 0 | 0.2 | | 1.451 | 67.8 |
| Sto | 0 | 600 | | | |

FIG. 6C

| | G3S1 | G3S2 | G3S3 | G3S4 | G2S1 | G2S2 | G1S1 |
|---|---|---|---|---|---|---|---|
| K | -2.70E-01 | -2.10E+00 | -2.35E+00 | -3.07E+00 | -3.21E-01 | -3.29E+00 | -8.61E+00 |
| A, 4th | 1.43E-01 | 2.58E-01 | -4.17E-03 | -5.94E-01 | -1.84E-01 | -3.43E-01 | -3.36E-02 |
| B, 6th | 2.86E-02 | -6.39E-02 | 1.48E+00 | 2.65E+00 | 1.81E+00 | 4.10E-01 | 1.12E-02 |
| C, 8th | 3.82E-01 | 7.45E-01 | -3.99E+00 | -5.27E+00 | -3.25E+00 | -3.71E-01 | -3.27E-03 |
| D, 10th | 0.00E+00 | 0.00E+00 | 2.88E+00 | 3.64E+00 | 2.86E+00 | 1.92E-01 | 0.00E+00 |

FIG. 7B

| Segment | Radius | Thickness | Angle | Lens index | Abbe number |
|---|---|---|---|---|---|
| 1 | 0 | 0.5 | | | |
| 2 | -6.083 | 0.498 | | 1.634 | 20.35 |
| 3 | -0.873 | 0.226 | | | |
| 4 | -0.518 | 0.350 | | 1.634 | 20.35 |
| 5 | -0.686 | 0.100 | | | |
| 6 | -0.773 | 0.361 | | 1.634 | 20.35 |
| 7 | -1.128 | 0.100 | | | |
| 8 | 0 | 0 | | | |
| 9 | 0 | 0.630 | | 1.928 | 24.11 |
| 10 | 0 | -1.260 | 30 | 1.928 | 24.11 |
| 11 | 0 | 2.420 | 60 | 1.928 | 24.11 |
| 12 | 0 | -1.260 | 60 | 1.928 | 24.11 |
| 13 | 0 | 0.630 | 30 | 1.928 | 24.11 |
| 14 | 0 | 0.142 | | 1.506 | 56.56 |
| 15 | -3.139 | 0.100 | | | |
| 16 | 0 | 0.200 | | 1.451 | 67.8 |
| Sto | 0 | 600 | | | |

*FIG. 7C*

| K | G3S1 | G3S2 | G2S1 | G2S2 | G1S1 |
|---|---|---|---|---|---|
| A, 4th | -4.73E+00 | -1.88E-01 | -1.02E+00 | -1.53E-01 | -8.69E-01 |
| B, 6th | 1.27E-01 | 4.72E-01 | 4.08E-01 | 8.10E-02 | -1.44E-03 |
| C, 8th | -3.41E-01 | -1.51E-01 | -5.70E-01 | -7.32E-03 | -3.50E-05 |
| D, 10th | 1.01E+00 | 3.21E-01 | 7.07E-01 | 8.50E-03 | 6.27E-05 |
| | -8.23E-01 | 4.77E-01 | -2.03E-01 | 8.62E-04 | 0.00E+00 |

FIG. 8B

| Segment | Radius | Thickness | Angle | Lens index | Abbe number |
|---|---|---|---|---|---|
| 1 | 0 | 0.603 | | | |
| 2 | -8.402 | 0.045 | | 1.634 | 20.35 |
| 3 | 0 | 0.300 | | 1.514 | 61.11 |
| 4 | 0 | 0.315 | | 1.634 | 20.35 |
| 5 | -0.817 | 0.210 | | | |
| 6 | -0.600 | 0.128 | | 1.634 | 20.35 |
| 7 | 0.000 | 0.300 | | 1.514 | 61.11 |
| 8 | 0.000 | 0.460 | | 1.634 | 20.35 |
| 9 | -1.305 | 0.100 | | | |
| 10 | 0 | 0 | | | |
| 11 | 0 | 0.820 | | 1.928 | 24.11 |
| 12 | 0 | -1.640 | 30 | 1.928 | 24.11 |
| 13 | 0 | 3.080 | 60 | 1.928 | 24.11 |
| 14 | 0 | -1.640 | 60 | 1.928 | 24.11 |
| 15 | 0 | 0.820 | 30 | 1.928 | 24.11 |
| 16 | 0.000 | 0.187 | | 1.536 | 55.98 |
| 17 | -3.803 | 0.100 | | | |
| 18 | 0 | 0.200 | | 1.451 | 67.8 |
| Sto | 0 | 600.000 | | | |

FIG. 8C

| K | G3S1 | G3S2 | G2S1 | G2S2 | G1S1 |
|---|---|---|---|---|---|
| A, 4th | -9.45E+00 | -4.75E-01 | -7.34E+00 | 2.28E+00 | -1.56E+00 |
| B, 6th | -6.02E-01 | 5.27E-01 | 2.19E-01 | 9.52E-02 | -2.09E-03 |
| C, 8th | 1.46E+00 | -1.98E-01 | 1.38E-02 | -2.42E-02 | -4.02E-05 |
| D, 10th | -8.96E-01 | 9.09E-01 | -3.09E-02 | 3.20E-02 | 6.26E-05 |
| | 0.00E+00 | -3.26E-01 | 1.37E-04 | -1.76E-03 | 0.00E+00 |

FIG. 9B

| Segment | Radius | Thickness | Angle | Lens index | Abbe number |
|---|---|---|---|---|---|
| 1 | 0 | 0.678 | | | |
| 2 | -1.218 | 0.050 | | 1.536 | 55.98 |
| 3 | 0 | 0.300 | | 1.514 | 61.11 |
| 4 | 0 | 0.350 | | 1.536 | 55.98 |
| 5 | -0.708 | 0.443 | | | |
| 6 | -1.158 | 0.050 | | 1.536 | 55.98 |
| 7 | 0 | 1.000 | | 1.514 | 61.11 |
| 8 | 0.000 | 0.237 | | 1.536 | 55.98 |
| 9 | -2.377 | 0.100 | | | |
| 10 | 0 | 0 | | | |
| 11 | 0 | 0.820 | | 1.928 | 24.11 |
| 12 | 0 | -1.640 | 30 | 1.928 | 24.11 |
| 13 | 0 | 3.080 | 60 | 1.928 | 24.11 |
| 14 | 0 | -1.640 | 60 | 1.928 | 24.11 |
| 15 | 0 | 0.820 | 30 | 1.928 | 24.11 |
| 16 | 0 | 0.176 | | 1.536 | 55.98 |
| 17 | -4.394 | 0.100 | | | |
| 18 | 0 | 0.200 | | 1.451 | 67.8 |
| Sto | 0 | 600 | | | |

FIG. 9C

|  | FIG. 2 | FIG. 4 | FIG. 5 | FIG. 6 | FIG. 7 | FIG. 8 | FIG. 9 |
| --- | --- | --- | --- | --- | --- | --- | --- |
| TTL | 4.56 | 4.09 | 4.7 | 4.36 | 3.44 | 4.39 | 4.82 |
| EFL | 4.53 | 4.51 | 4.53 | 4.53 | 3.58 | 4.52 | 4.53 |
| Group1 EFL | 8.47 | 7.51 | 8.46 | 7.91 | 6.21 | 7.52 | 8.69 |
| Group2 EFL | -87.17 | -3.9 | -10.98 | -5.24 | -6.39 | -3.80 | -6.90 |
| Group3 EFL | 3.46 | 1.77 | 2.68 | 1.99 | 2.14 | 1.74 | 2.29 |
| Prism thickness | 1.54 | 1.54 | 1.54 | 1.54 | 1.21 | 1.54 | 1.54 |
| Prism length | 8 | 8 | 8 | 8 | 6.20 | 8 | 8 |
| Prism angle | 30 | 30 | 30 | 30 | 30 | 30 | 30 |
|  |  |  |  |  |  |  |  |
| Group1 power | 0.12 | 0.13 | 0.12 | 0.13 | 0.16 | 0.13 | 0.12 |
| Group2 power | -0.01 | -0.26 | -0.09 | -0.19 | -0.16 | -0.26 | -0.14 |
| Group3 power | 0.29 | 0.56 | 0.37 | 0.5 | 0.47 | 0.57 | 0.44 |
|  |  |  |  |  |  |  |  |
| Prism thickness / TTL | 0.34 | 0.38 | 0.33 | 0.35 | 0.35 | 0.35 | 0.32 |
| G1_Power/ (G2_Power+G3_Power) | 0.42 | 0.43 | 0.42 | 0.41 | 0.52 | 0.43 | 0.39 |
| EFL / Prism thickness | 2.94 | 2.93 | 2.94 | 2.94 | 2.96 | 2.94 | 2.94 |
| G1_EFL / Prism length | 1.06 | 0.94 | 1.06 | 0.99 | 1 | 0.94 | 1.09 |

FIG. 10

LIGHT-FOLDED PROJECTOR

This application claims benefit of priority of U.S. Provisional Application Ser. No. 63/152,550, filed Feb. 23, 2021, which is hereby incorporated by reference herein in its entirety.

BACKGROUND

Technical Field

This disclosure relates generally to a mobile multipurpose device and more specifically to a mobile multipurpose device including a light-folded projector.

Description of the Related Art

Mobile multipurpose devices such as smartphones, tablets, and/or pad devices are considered as a necessity nowadays. They integrate various functionalities in one small package thus providing tremendous convenience for use. Sometimes, a mobile multipurpose device may include a screen "notch" such as a little cut-out, e.g., at the top of the display. The notch provides accommodation for imaging and sensing components such as the front-facing camera (e.g., a selfie camera), infrared (IR) projector, and IR detector within the edge-to-edge display. While the notch allows for bezels to be reduced or eliminated, it still limits the overall display area for a device. Therefore, it is desirable to reduce footprint of the imaging and sensing components to maximize the display area for a device.

BRIEF DESCRIPTION OF THE DRAWINGS

FIGS. 1A-1C are simplified schematic diagrams showing example designs for the imaging and sensing components of a device, according to some embodiments.

FIGS. 2A-2C show an example light-folded projector of a device, according to some embodiments.

FIGS. 4A-4C show an example light-folded projector of a device, according to some embodiments.

FIGS. 5A-5C show an example light-folded projector of a device, according to some embodiments.

FIGS. 6A-6C show an example light-folded projector of a device, according to some embodiments.

FIGS. 7A-7C show an example light-folded projector of a device, according to some embodiments.

FIGS. 8A-8C show an example light-folded projector of a device, according to some embodiments.

FIGS. 9A-9C show an example light-folded projector of a device, according to some embodiments.

FIG. 10 show example parameters for example light-folded projectors, according to some embodiments.

Figure 2A:
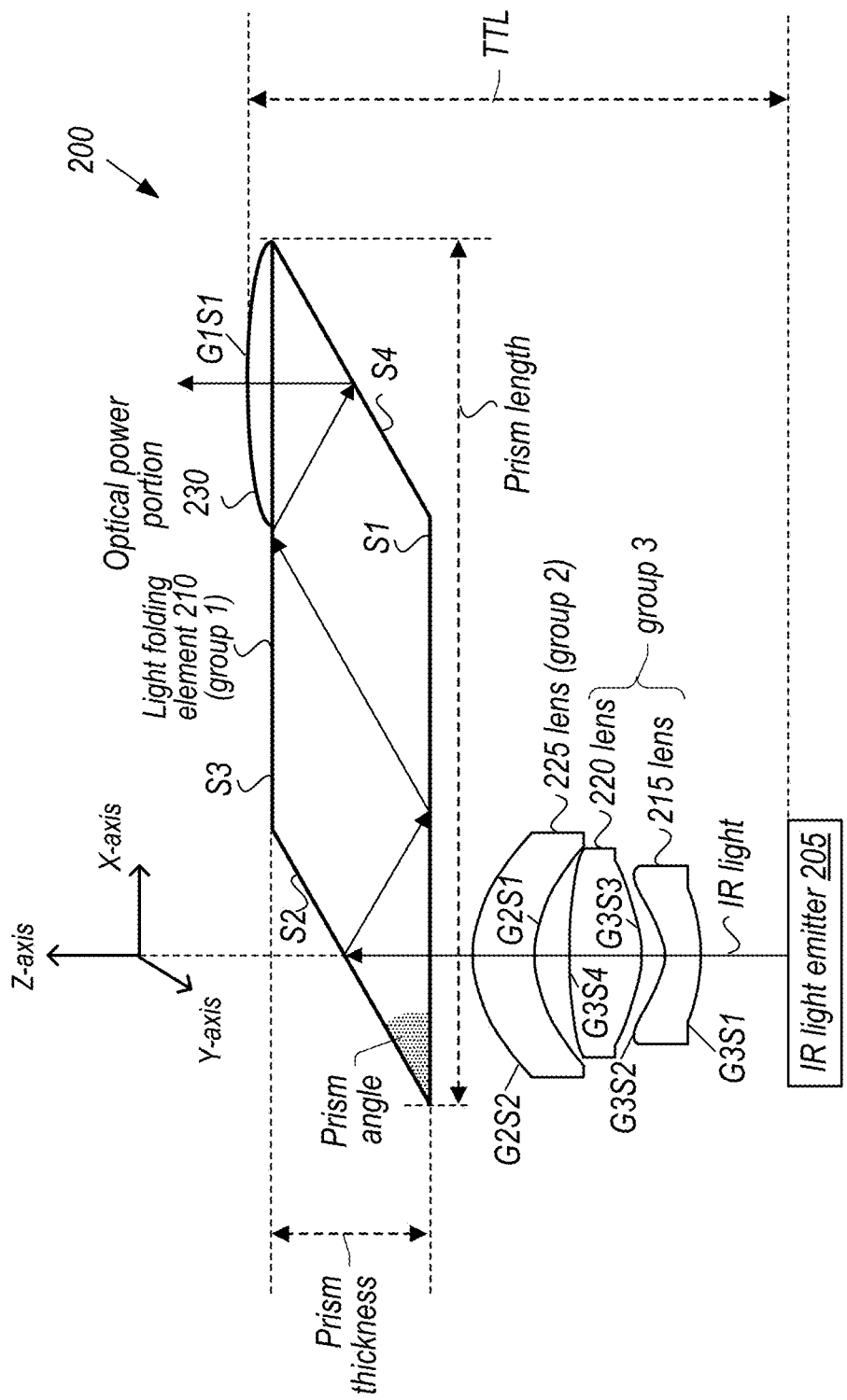

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a device that may use a light-folded projector to reduce footprint of components to maximize the display area for the device. In some embodiments, the device may include several imaging and sensing components, such as a front-facing camera, an IR projector, and an IR detector (hereinafter named "the imaging and sensing components"). The IR projector may include an IR light emitter and a light folding element. In some embodiments, the light folding element may include a multi-surface prism. The light folding element may receive IR light emitted from the IR light emitter, fold the IR light (e.g., change the transmission direction of the IR light) one or more times, and guide it passing through the light folding element to project the IR light through a projector aperture to an external environment. The IR detector (e.g., an IR camera) may receive IR light reflected from an object in the environment (e.g., a user's face) through a detector aperture and provide detection and/or recognition of the object (e.g., face recognition) in front of the device. The front-facing camera, e.g., a fixed-focus or autofocus (AF) camera, may be used to take pictures of objects in the environment in front of the device. In some embodiments, the device may be a mobile multipurpose device, such as a smartphone, a tablet, a pad, and the like.

The use of the light-folded projector can reduce footprint of the imaging and sensing components of a device to increase the display area for the device such as a device with bezels. In particular, the use of the light folding element can provide more flexibility for positioning the IR light emitter with respect to the other components such as the IR detector and front-facing camera. For instance, because the light folding element can change the transmission direction of the IR light, the IR light emitter may not necessarily be limited to a specific installation location. Instead, the IR light emitter may be placed at a location with less-constrained space, and use the light folding element to project the IR light in a specific direction. This can reduce the overall size of the imaging and sensing components, thus decreasing size of a notch for holding the imaging and sensing component and increasing the display area of the device. In some embodiments, the light folding element may be positioned at least partially between an enclosure of the front-facing camera and an closure of the device. For instance, at least a portion of the light folding element may be positioned between a portion of the front-facing camera and a cover glass of the device.

In some embodiments, the device may include one or more lenses optically between the IR light emitter and the light folding element such that the one or more lenses may pass through the IR light from the IR light emitter to the light folding element. The one or more lenses may provide optical power to the light-folded projector such that the light-folded projector may have the ability to focus the emitted IR light. This can improve the object detection and/or recognition performance for the device. In some embodiments, the one or more lenses may include at least one lens made of plastics (e.g., a plastic lens), glass (e.g., a glass lens), polycarbonate (e.g., a polycarbonate lens), or other optical materials. In some embodiments, the one or more lenses may include at least one wafer scale lens or wafer level lens. A wafer scale lens is generally manufactured on the wafer level, e.g., using wafer-scale imprint and/or wafer-level packaging. With the wafer scale optics technology, thousands of lenses may be manufactured simultaneously on a semiconductor wafer—thus greatly improving efficiency for mass production. Further, the wafer scale optics technology may reduce the size of the lenses compared to other manufacturing processes. In some embodiments, the at least one wafer scale lens may be formed by bonding or mounting one or more plastic portions to a glass substrate.

In some embodiments, the light folding element itself may have optical power to further enhance the IR focusing capability of the light-folded projector. For instance, the light folding element may include a portion having optical power bonded to the front surface of the prism of the light folding element facing the environment. Alternatively, in some embodiments, the light folding element itself may not necessarily possess optical power, and the light-folded projector may further include at least one lens (e.g., a plastic, glass, or polycarbonate lens) with optical power that may be separate from the light folding element and positioned outside the front surface of the light folding element. The at least one lens may pass through IR light existing from the light folding element to the environment.

In some embodiments, the light folding element may include coating at one or more surfaces of the prism of the light folding element. For instance, the light folding element may have coating at a rear surface facing the IR light emitter. In some embodiments, the light folding element may include coating at a front surface facing the environment. In some embodiments, the coating may be designed to increase (1) the transmittance for IR light of a relatively low incident angle and/or (2) the reflectance for IR light of a relatively high incident angle, at the corresponding surface. As described below, the coating may improve the IR light guiding performance of the light folding element.

FIGS. 1A-1C are simplified schematic diagrams showing example designs for the imaging and sensing components of a device, according to some embodiments. FIGS. 1A-1C each shows a partial top view and a partial cross-sectional view of a device. For purposes of illustration, only relevant components are depicted in the figures. FIGS. 1A-1C also illustrate a global optical coordination system defined by X-Y-Z axes, where Z-axis corresponds to the optical axis of camera 105 and X-Y axes are orthogonal to Z-axis. In FIG. 1A, device 100 may include imaging and sensing components such as front-facing camera 105, IR light emitter 110, light folding element 115, and IR detector 120. In this disclosure, IR light emitter 110 and light folding element 115 collectively may be referred to as a light-folded projector. As indicated in FIG. 1A, device 100 may further include a cover glass that may further include a black mask to hide the imaging and sensing components under the cover glass. The light-folded projector and IR detector 120 may operate together to implement object detection and/or recognition functions, whilst front-facing camera 105 may be used to take pictures of objects in front of device 100. For instance, the light-folded projector may project IR light through a projector aperture to the environment in front of device 110, and IR detector 120 may receive IR light reflected from an object in the environment through a detector aperture to accomplish the object detection and/or recognition. Camera 105 may be a front-facing camera that may capture images of objects in the environment based on visible light received through a camera aperture. In some embodiments, front-facing camera 105 may be a fixed-focus camera having a constant focal length. In some embodiments, front-facing camera 105 may be an autofocus camera whose focal length may be automatically adjusted, e.g., using an actuator. In this example, the projector aperture, detector aperture, and camera aperture are shown to be aligned approximately in a straight line inside a notch. Note that this is only an example for purposes of illustration. The apertures are not limited to positions in a straight line, but rather may individually be placed in one of various locations. In addition, because the visible light can pass through the cover glass, and the IR light can pass through the cover glass and the black mask, the projector aperture, detector aperture, and camera aperture may not necessarily refer to a physical hole or opening on the cover glass or black mask, but rather the portion of the cover glass or black mask through which the visible light and IR light transmits.

Light folding element 115 may fold IR light generated from IR emitter 110 and change its transmission direction one or more times within light folding element 115 to project the IR light out of device 100 in a specific direction. This may free up the positioning of IR emitter 110. For instance, IR emitter 110 may not necessarily be restricted to installation right below the projector aperture. Rather, IR emitter 110 may be displaced from the projector aperture, and use light folding element 115 to fold the IR light to still project it through the projector aperture. For instance, in FIG. 1A, camera 105 and IR detector 120 may be positioned lateral to each other underneath their respective apertures (e.g., along X-axis). IR emitter 110 may not necessarily be in line with camera 105 and IR detector 120 but displaced to at least partially overlap with IR detector 120 (e.g., along Y-axis), as indicated in FIG. 1A. As a result, the camera aperture, projector aperture, and detector aperture may be still aligned with each other, whilst IR emitter 110 may shift from camera 105 and IR detector 120. Further, light folding element 115 may use readily-available space inside device 100, e.g., the space between an enclosure of camera 105 and an enclosure of device 100. In this example, at least a portion of light folding element 115 may be positioned between a portion of camera 105 and the cover glass of device 100, as indicated in the cross-sectional view in FIG. 1A. This also avoids interference between (1) the IR light transmitted from IR light emitter 110 through light folding element 115 to the environment and (2) the IR light reflected from the environment to IR detector 120. In other words, the reflected IR light may be received by IR detector 120, without passing through light folding element 115. The overlapping spatial arrangement may lower the footprint of these imaging and sensing components.

Footprint reduction of the imaging and sensing components by use of a light-folded projector (with a light folding element) is illustrated by FIG. 1B. In FIG. 1B, device 140 does not include a light-folded projector, different from device 100 in FIG. 1A. Therefore, front-facing camera 105, IR emitter 110, and IR detector 120 may not spatially overlap each other, but rather be positioned lateral to each other (e.g., along X-axis). This may therefore increase the footprint of the imaging and sensing components. For instance, as reflected by size of a notch, the length of the notch may increase from L1 for device 100 to L2 for device 140. In other words, the light-folded projector in FIG. 1A may reduce the size of the notch and increase the display area for device 100.

In addition, as the footprint reduction frees up space inside the device, this provides flexibility to increase components size, arrange components inside the device, and/or reduce the overall size of the device. For instance, in some embodiments, the device may increase the size of the camera and/or IR detector to facilitate larger image sensors and/or optics, add additional functions (e.g., an autofocus function), and the like. As shown in FIG. 1C, device 150 may use front-facing camera 155 that is larger than front-facing camera 105 in FIG. 1B, according to some embodiments. However, this may not necessarily sacrifice size of the display area of device 150 due to the space-saving by the light-folded projector. For instance, the length of the notch (e.g., L3) of device 150 having a light-folded projector may be still less than or close to the length of the notch (e.g., L2) of device 140 without a light-folded projector.

Note that for purposes of illustration, this disclosure uses IR light as an example to describe the object detection and/or recognition. In some embodiments, the device may use light in another wavelength spectrum to implement object detection and/or recognition. In addition, FIGS. 1A-1C only illustrate the front-facing camera, IR light emitter, light folding element, and IR detector for purposes of illustration. In some embodiments, the device may include one or more additional imaging and sensing components behind a notch.

FIGS. 2A-2C show an example light-folded projector of a device, according to some embodiments. In this example, light-folded projector 200 may include IR light emitter 205 and light folding element 210. IR light emitter 205 may emit IR light. Light folding element 210 may receive the IR light from IR light emitter, fold and guide the IR light passing through light folding element 210 to the environment. For instance, light folding element 210 may reflect the IR light at surface(s) to change the transmission direction of the IR light. In some embodiments, light folding element 210 may fold the IR light one or more times. For instance, in some embodiments, light folding element 210 may include a parallelogrammatic prism, which may be made of plastics, glass or other appropriate optical materials. In some embodiments, the prism may be a single piece element such as a monolithic solid prism or a single piece prism with an interior cavity. In some embodiments, the prism may be formed by joining several separate pieces together (e.g., a rectangular prism joined with two triangular prisms). A shown in FIG. 2A, the prism of light folding element 210 may include a first surface S1 in parallel with a third surface S3, and a second surface S2 in parallel with a fourth surface S4. In some embodiments, light folding element 210 may be arranged with respect to IR light emitter 205 such that the first surface S1 faces IR light emitter 205, whilst the third surface S3 faces the environment. For purposes of illustration, the first surface S1 facing IR light emitter is also referred to as a rear surface, whilst the third surface S3 facing the environment is also named as a front surface. Note that for purposes of illustration, FIG. 2A illustrates the prism to implement light folding. In some embodiments, light folding element 210 may use other appropriate optical components, such as one or more mirrors, to fold IR light.

In this example, as shown in FIG. 2A, light folding element 210 may transmit the IR light emitted from IR emitter 205 through the first surface S1 of the prism in to light folding element 210. At least some of the IR light may arrive at and then get reflected at the second surface S2 of the prism of light folding element 210, as indicated by the edge in FIG. 2A—e.g., the IR light being folded once. At least some of the IR light reflected from the second surface S2 may bounce back to the first surface S1, as indicated by the edge in FIG. 2A. When the incident angle of the IR light is close to or greater than the critical angle of the prism, total internal reflection (TIR) may occur and the IR light may be reflected at the first surface S1—e.g., the IR light being folded twice. Next, at least some of the IR light reflected from the first surface S1 may transmit to and become reflected at the third surface S3 of the prism of light folding element 210 under TIR—e.g., the IR light being folded three times. Finally, at least some of the IR light reflected from the third surface S3 may reach the fourth surface S4 of the prism, get reflected at the fourth surface S4 under TIR, and exit the prism of light folding element 210 through the third surface S3 to the environment—e.g., the light being folded four times. Therefore, in this example, at least some IR light from IR emitter 205 may be folded four times by light folding element 210. Note that, in some embodiments, light folding element 210 may include a prism of a different geometry, and thus may fold the IR light less or more times.

In some embodiments, light-folded projector 200 may further include one or more lenses 215, 220, and 225. Lenses 215-225 may be positioned optically between IR light emitter 205 and light folding element 210, such that these lenses may pass through the IR light emitted from IR light emitter 205 to light folding element 210. In some embodiments, lenses 215-225 may have optical power—e.g., a degree to which a lens converges (e.g., corresponding to positive optical power) or diverges (e.g., corresponding to negative optical power) the IR light—such that light-folding projector 200 may have the ability to focus the emitted IR light.

In some embodiments, light folding element 210 itself may have optical power to further enhance the IR focusing capability of light-folded projector 200. For instance, light folding element 210 may include portion 230 that may have optical power and may be bonded to the third surface S3 of light folding element 210 that faces the environment. This way, the IR light existing the prism of light folding element 210 may further pass through the optical power portion to exit to the environment. Alternatively, in some embodiments, light folding element 210 itself may not necessarily possess optical power, and light-folded projector 200 may further include at least one lens with optical power that may be separate from light folding element 210 and positioned proximate the third surface S3 of light folding element 210 (as shown below in FIG. 3C). The at least one lens may pass through and further focus the IR light existing from light folding element 210.

In some embodiments, light folding element 210 may be formed using various materials and approaches. For instance, when light folding element 210 includes optical power portion 230, portion 230 may be made of plastics, and the remaining portion of light folding element 210 (e.g., the parallelogrammatic prism) may be made of glass. The two portions may then be bonded together, e.g., using glues, to form light folding element 210 that has optical power. Alternatively, the prism of light folding element 210 and portion 230 may be made of a same material (e.g., plastics or glass), wherein the two portions may be created separately and subsequently bonded together or may be formed altogether at the same time. In some embodiments, lenses 215-225 and/or the at least one lens proximate the third surface S3 of light folding element 210 may be generated using various materials and approaches as well. For instance, one or more of the lenses may be made of plastics, glass, or polycarbonate. In some embodiments, one or more of the lenses may be a wafer scale lens, e.g., including one or more plastic portions bonded to a glass substrate.

In some embodiments, light folding element 210 may be designed such that an acute angle between two adjacent surfaces of the prism (e.g., between the first surface S1 and second surface S2 of light folding element 210) is in a range between 25 and 35 degrees (e.g., 25 prism angle 35 degrees). In some embodiments, the ratio between the thickness of the prism of light folding element 210 and the total track length (TTL) of light-folded projector 200 may be in a range between 0.3 and 0.5 (e.g., 0.3 prism thickness/TTL 0.5). As indicated in FIG. 2A, the thickness and TTL are measured in a direction approximately in parallel with the optical axis (or Z-axis) of lenses 215-225. For instance, the thickness may refer to the distance approximately between the first surface S1 (facing IR light emitter 205) and the third surface S3 (facing the environment) of the prism of light folding element 210. The TTL may correspond to the distance approximately between a front surface of IR light emitter 205 (facing light folding element 210) and a front surface G1S1 of portion 230 (facing the environment) of light folding element 210. In some embodiments, lenses 215-225 may have positive or negative optical power. For instance, in this example, group 1 (including light folding element 210) may have positive optical power, group 2 (including lens 225) may have negative optical power, and group 3 (including lens 215 and 220) may have positive optical power. In some embodiments, absolute values of the optical power of group 1, group 2, and group 3 may have a relationship such that 0.2≤(optical power of group 1)/[(absolute value of optical power of group 2)+(optical power of group 3)]≤0.6. In some embodiments, a ratio between the effective focal length (EFL) of light-folded projector 200 and thickness of the prism of light folding element 210 may be in a range between 2 and 4 (e.g., 2≤(EFL of light-folded projector)/prism thickness≤4). In some embodiments, a ratio between the effective focal length (EFL) of group 1 and length of the prism of light folding element 210 (e.g., measured in a direction approximately in parallel with the X-axis as indicated in FIG. 2A) may be in a range between 0.8 and 1.2 (e.g., 0.8≤(EFL of group 1)/prism length≤1.2).

FIGS. 2B-2C provide example values for some parameters of light-folded projector 200. For instance, in FIG. 2B, k, A, B, C, and D refer to the parameters in the following equation for design of the aspherical surfaces of lenses 215-225 and optical power portion 230 (e.g., surfaces G3S1 and G3S2 of lens 215, G3S3 and G3S4 of lens 220, G2S1 and G2S2 of lens 225, and G1S1 of portion 230):

$$z = \frac{\frac{h^2}{r}}{1 + \sqrt{1 - \frac{(1+k)h^2}{r^2}}} + Ah^4 + Bh^6 + Ch^8 + Dh^{10}...$$

where z refers to the sag of an aspherical surface parallel to the optical axis of the lens, h is the radial distance from the optical axis, r is the radius of the curvature, k is the conic constant, and A, B, C, and D refer to the $4^{th}$, $6^{th}$, $8^{th}$, and $10^{th}$ order aspherical coefficients. In FIG. 2C, the radius refers to a radial distance of a surface of a corresponding optical component (including lens 215-225, light folding element 210, and optical power portion 230) from its own optical axis, the thickness refers to a travel distance in each segment of the optical path of a principal IR light ray that transmits from IR emitter 205 through lenses 215-225 along the optical axis (or Z-axis) of lenses 215-225 (as indicated in FIG. 2A), the angle refers to the incident angle of the principal IR light ray at a corresponding surface of light folding element 210, and the lens index and Abbe number refer to the index and Abbe number of individual optical component. For instance, the radiuses on rows 2 to 7 correspond to the radiuses of the surfaces of lenses 215-225, whilst thicknesses on rows 9 to 13 refer to the travel distances of the principal IR light within the prism of light folding element 210.

Figure 3D:
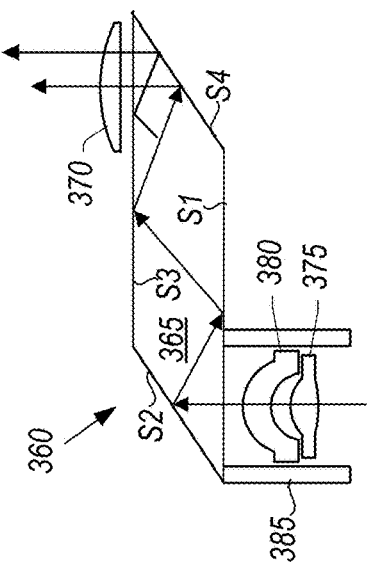
FIGS. 3A-3D are simplified schematic diagrams showing example designs of optics for a light-folded projector, according to some embodiments.
Figure 3C:
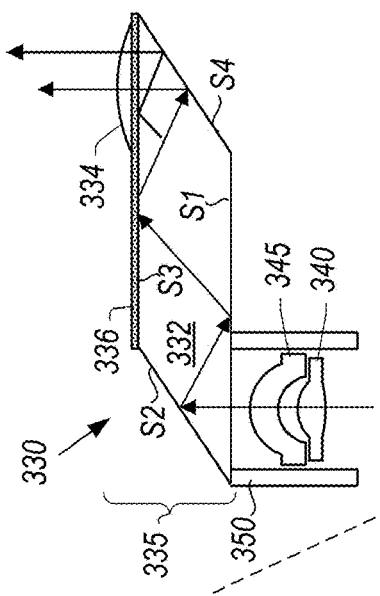
Figure 3A:
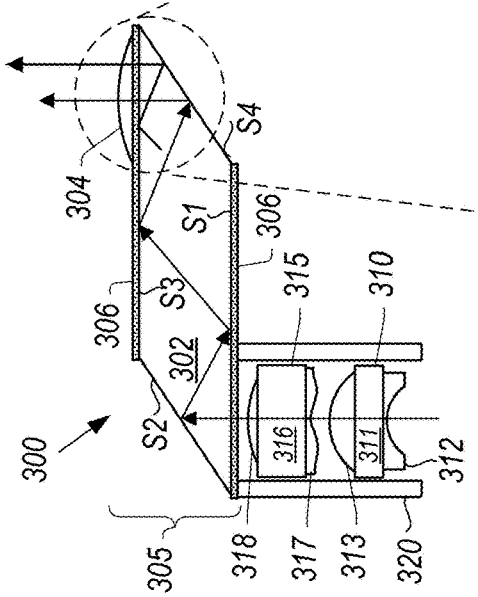

FIGS. 3A-3D are simplified schematic diagrams showing example designs of optics for a light-folded projector, according to some embodiments. As shown in FIG. 3A, light-folded projector 300 may include light folding element 305, and one or more lenses 310-315. In some embodiments, light folding element 305 may include prism 302 (e.g., a parallelogrammatic prism) and portion 304 that may be bonded to prism 302. As described above, in some embodiments, prism 302 and portion 304 may be made of different materials. For instance, prism 302 may be formed using glass, whilst portion 304 may be made of plastics. Portion 304 may be bonded to prism 302, e.g., using glues. Alternatively, prism 302 and portion 304 may be made of a same material, and may be formed altogether at the same time or created separately first and joined together subsequently.

In some embodiments, prism 302 may not necessarily have optical power, but portion 304 may have optical power (e.g., having a convex front surface as shown in FIG. 3A). As a result, light folding element 305 as a whole may have optical power and be able to focus IR light. In some embodiments, lenses 310 and 315 may be arranged optically between an IR light emitter (not shown) and light folding element 305, such that lenses 310 and 315 may pass through IR light from the IR light emitter to light folding element 305. As describes above, lenses 310 and 315 may include plastic lens(es), glass lens(es), polycarbonate lens(es), or other type of optical lens(es). In this example, lenses 310 and 315 may be wafer scale lenses each of which may include one or more plastic portions attached to a glass substrate. For instance, lens 310 may include plastics portions 312 and 313 bonded to glass substrate 311, whilst lens 315 may be formed by bonding plastic portions 317 and 318 to glass substrate 316. Plastic portions 312/313 and 317/318 of lenses 310 and 315 may have optical power, as indicated by the geometry of plastics 312/313 and 317/318 in FIG. 3A. In addition, as shown in FIG. 3A, light-folded projector 300 may use barrel 320 as a mechanical support to hold lenses 310 and 315. For instance, barrel 320 may include interior threads, and lenses 310 and 315 may be screwed in to barrel 320 through the threads.

Figure 3B:
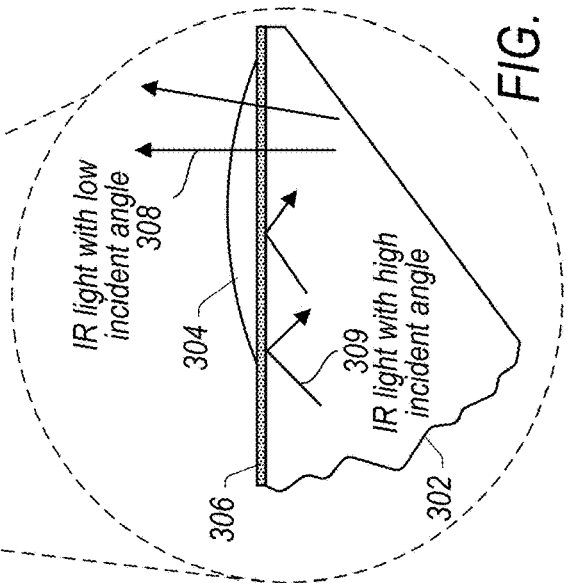
Figure 4A:
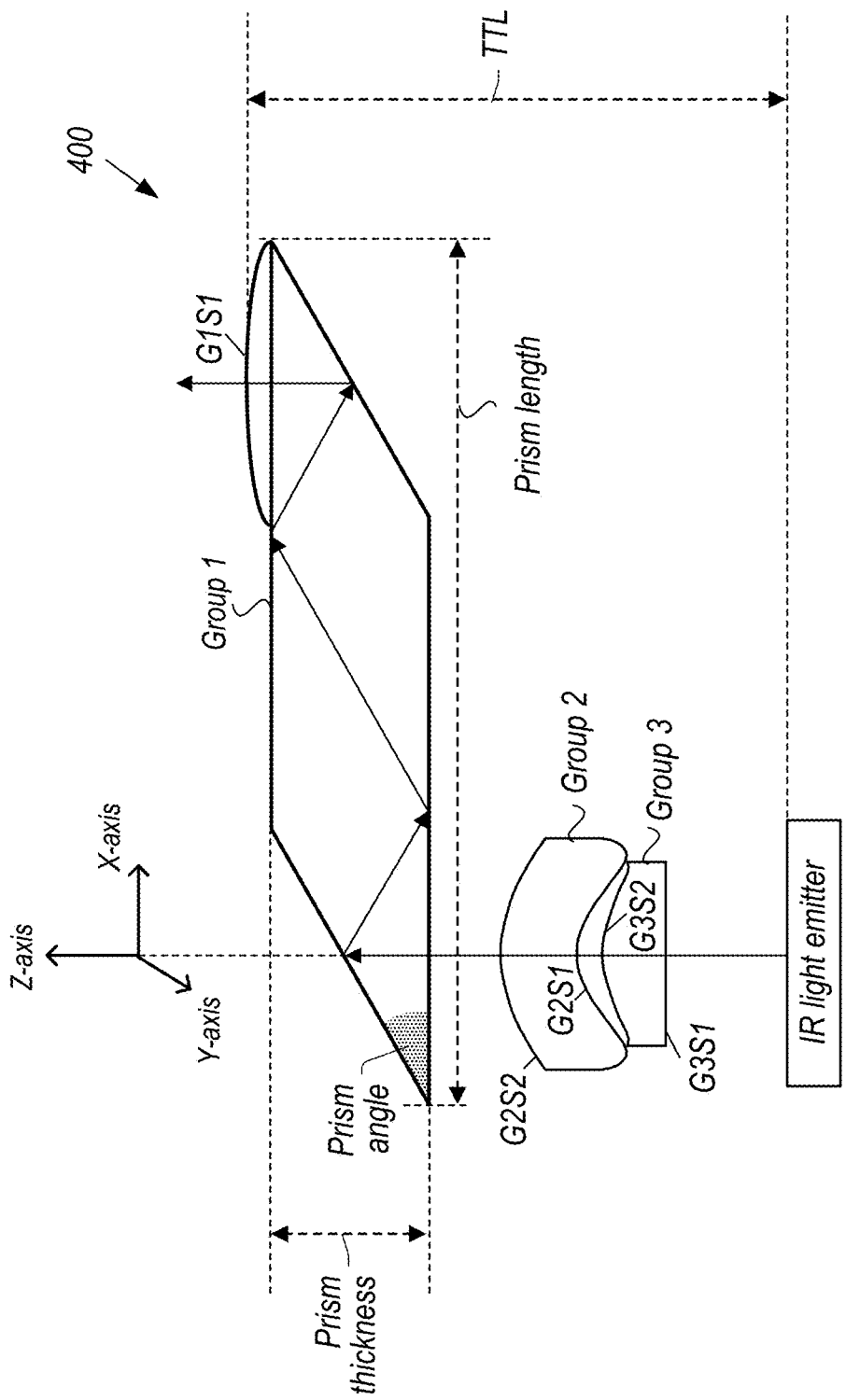
Figure 5A:
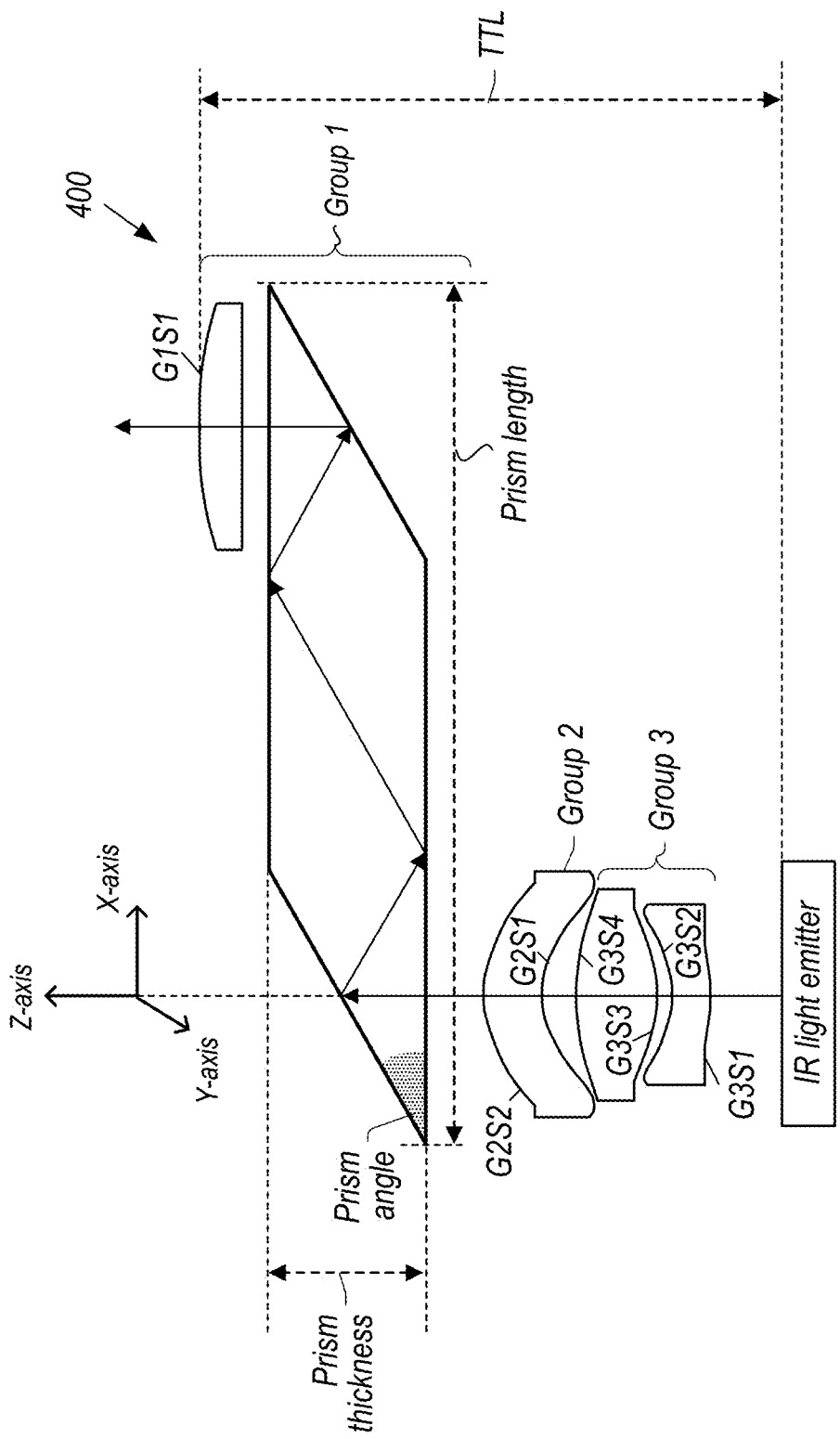
Figure 6A:
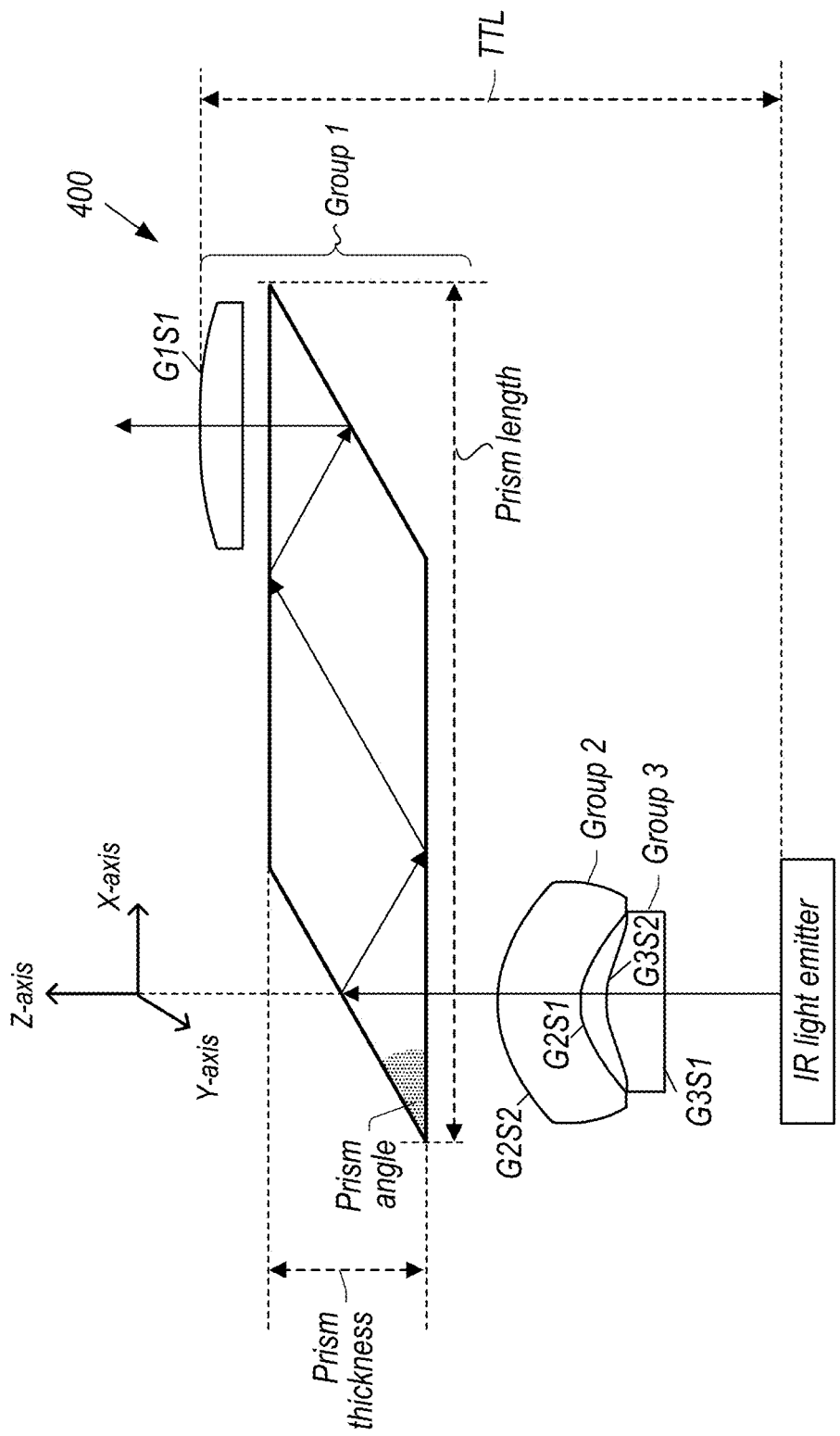
Figure 7A:
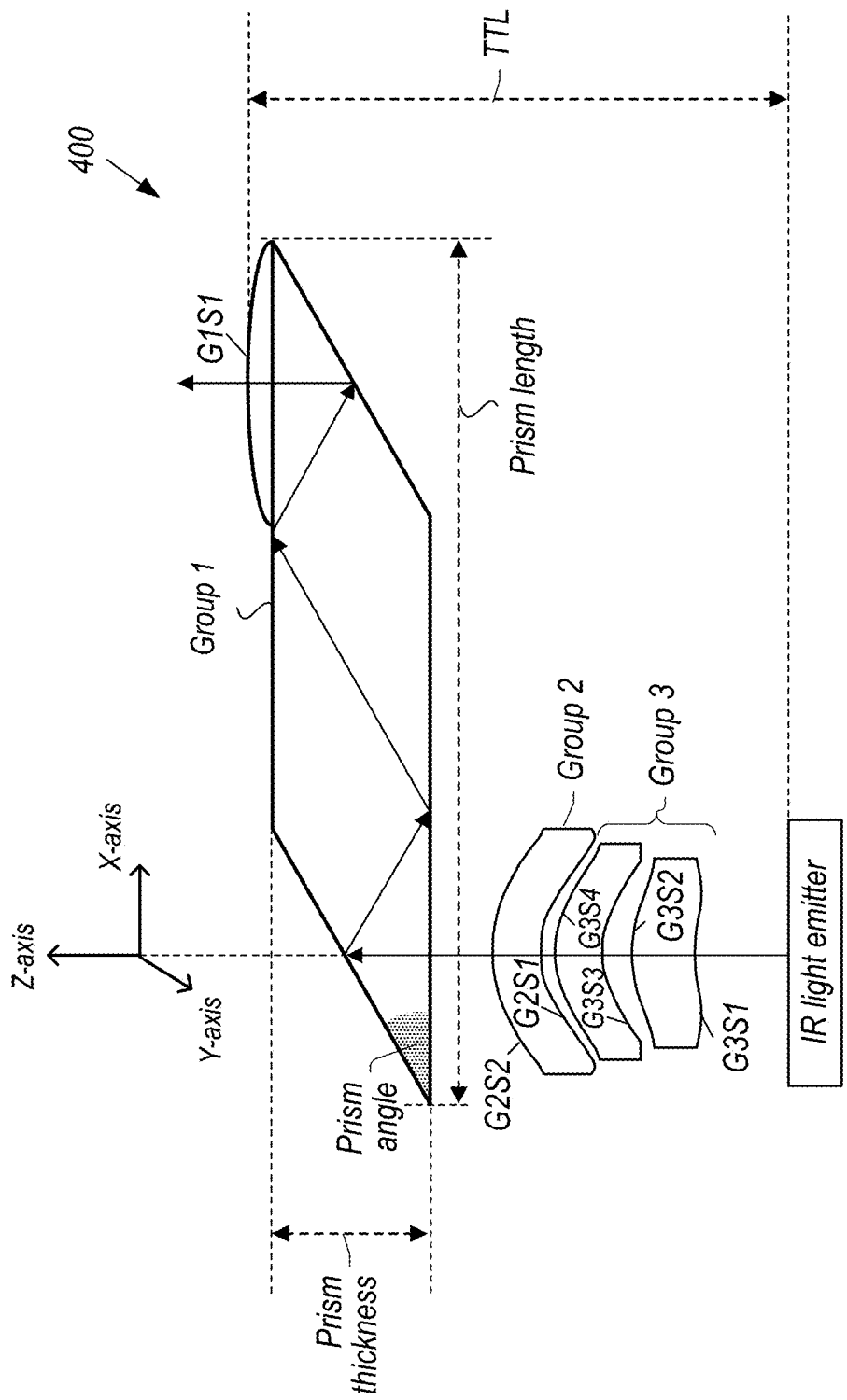
Figure 8A:
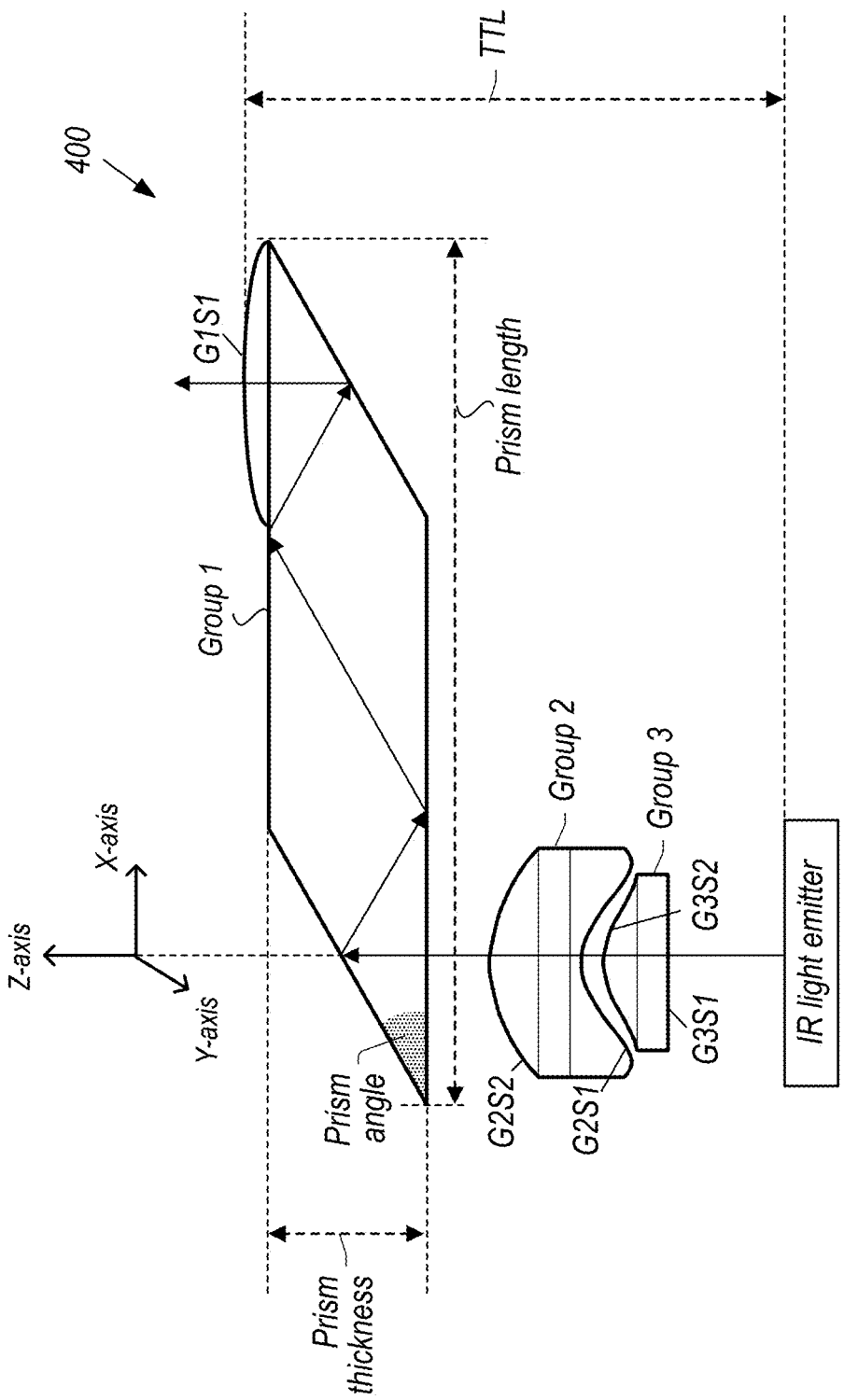
Figure 9A:
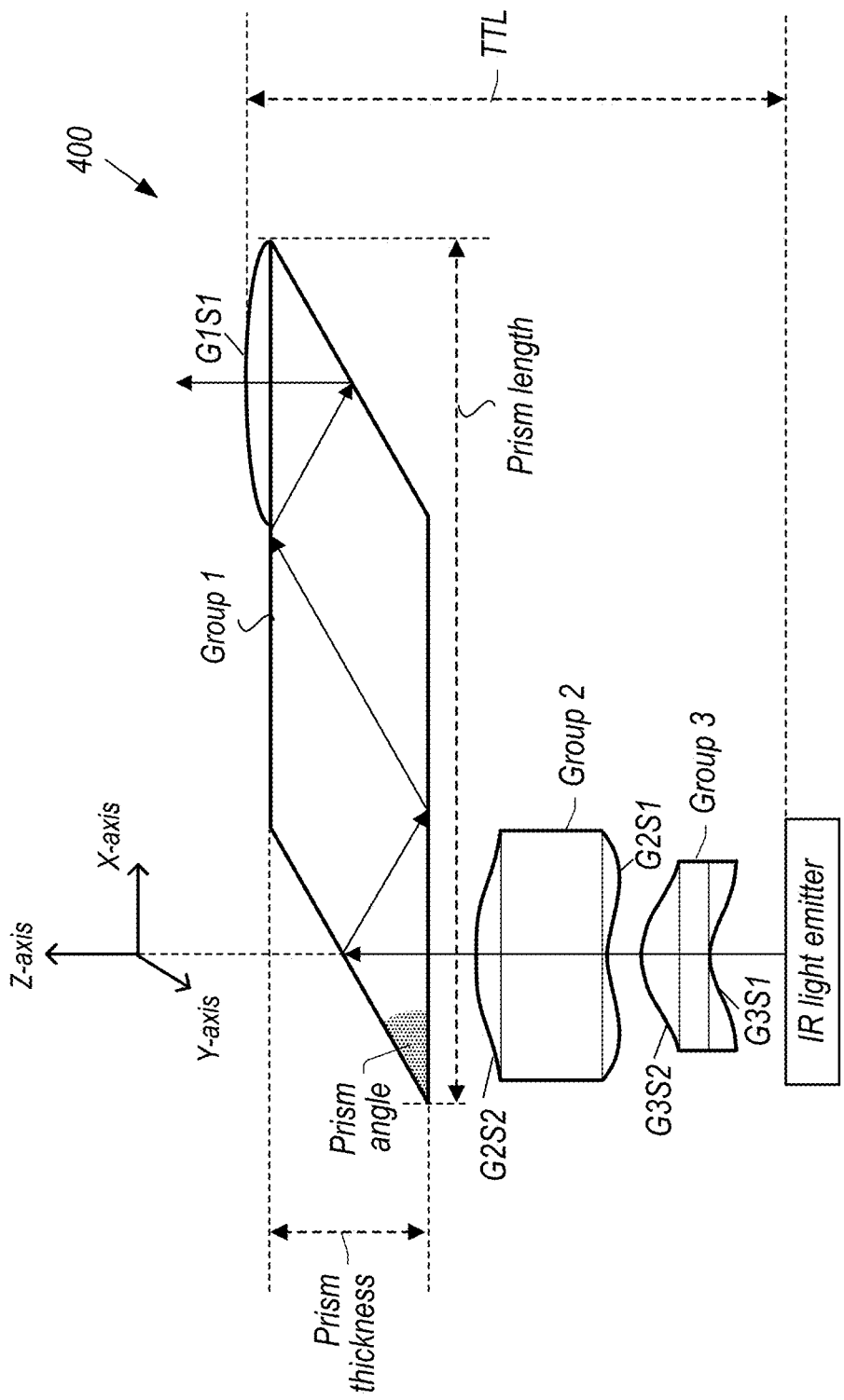

As described above, during transmission of the IR light, the first surface S1 and third surface S3 of prism 302 may each transmit IR light when the IR light has a relatively low incident angle, as well as reflect the IR light when the IR light has a relatively high incident angle. Therefore, in some embodiments, light folding element 305 may include coating 306 at the first surface S1 and/or third surface S3, in order to enhance transmission and/or reflection of the IR light at the corresponding surface. FIG. 3B shows a zoom-in view of the circular area indicated in FIG. 3A. In FIG. 3B, in some embodiments, coating 306 may be immersed at the third surface S3 of prism 302 facing the environment (e.g., covering at least the area between prism 302 and portion 304). In some embodiments, coating 306 may also be applied at the first surface S1 of prism 302 facing lenses 310-315 and the IR light emitter. In some embodiments, coating 306 may increase the transmittance for IR light 308 that may have a relatively low incident angle (e.g., an incident angle below 15 degrees), and/or increase the reflectance for IR light 309 that may have a relatively high incident angle (e.g., an incident angle beyond 45 degrees), at the corresponding surface of prism 302. In some embodiments, coating 306 may be created using materials such as titanium dioxide ($TiO2$) or silicon dioxide ($SiO2$). In addition, in some embodiments, retardance of coating 306 may be reduced in order to achieve better transmittance wavefront for the IR light after it is projected by light-folded projector 300.

FIG. 3C shows another example optical design for a light-folded projector. In this example, light-folding projector 330 may not necessarily include wafer scale lenses 310 and 315, but instead plastic lenses 340 and 345. Further, light folding element 335 of light-folded projector 330 may include prism 332 (e.g., a glass prism) and portion 334 (e.g., a plastic lens). Therefore, light folding element 335 may still have coating 336 at the third surface S3, but not at the first surface S1 because the optical properties of lenses 340 and 345 are now different from wafer scale lenses 310 and 315.

FIG. 3D shows still another example optical design for a light-folded projector. In this example, light-folded projector 360 may include plastic lenses 375-380, and light folding element 365. In addition, light-folding projector 360 may include at least one lens 370, e.g., a plastic lens, that may be separate from light folding element 365 and positioned proximate the third surface S3 facing the environment. As a result, lens 370 may pass through light exiting from light folding element 365 to the environment. In some embodiments, lens 370 may have optical power. Compared to FIGS. 3A-3C, because lens 370 is not part of light folding element 365 and not attached directly with a prism, the optical properties of lens 370 for the IR light may be different from portion 304 (of light folding element 305) and portion 334 (of light folding element 335). Therefore, light-folded projector 360 may not necessarily include coating at the third surface S3 of light folding element 365. Similar to FIG. 3C, light-folded projector 360 may not necessarily use coating at the first surface S1 either. Note that FIGS. 3A-3D are examples for purposes of illustration only. In some embodiments, the use of wafer scale lens(es) (e.g., wafer scale lenses 310 and 315) or non-wafer scale len(es) (e.g., lenses 345/350 and 375/370), light folding element with or without optical power (e.g., with directly bonded optical power portion 304/334 or with separate lens 370), and coating (e.g., coating 306 and 336) may be combined in other ways. In addition, FIGS. 3A-3D depict two lenses (e.g., lenses 310 and 315) proximate the rear surface of the light folding element facing the IR light emitter, and one lens (e.g., lens 370) proximate the front surface of light folding element facing the environment for purposes of illustration only. In some embodiments, a light-folded projector may include less or more lenses proximate either or both surfaces of the light folding element.

FIGS. 4-9 illustrate additional example light-folded projectors and associated design parameters, according to some embodiments. As shown in FIGS. 4-9, in some embodiments, a light-folded projector may include various designs of lens(es) proximate the rear and/or front surfaces of a light folding element. For instance, in FIG. 4A, light-folded projector 400 may have two lenses proximate the rear surface of the light folding element (e.g., similar to FIG. 3). By comparison, in FIG. 5A, light-folded projector 500 may have three lenses proximate the rear surface (e.g., similar to FIG. 2). Further, as indicated in FIGS. 4-9, the lenses may have different geometries, use different materials, and be generated using different approaches. For instance, the lenses in FIG. 4A may be plastic lenses, whilst the lenses in FIGS. 8A and 9A are shown as wafer scale lenses. In addition, as shown in FIGS. 4-9, in some embodiments, design of the light folding elements may also vary. For instance, in FIGS. 4A, 7A, 8A, and 9A, the light folding element may include an optical power portion—the light folding element may have optical power. By comparison, in FIGS. 5A and 6A, the light folding element itself may not necessarily have optical power, but the light-folded projector may further include a separate lens (e.g., like lens 370 in FIG. 3D) proximate the front surface of the light folding element that faces the environment. The differences are also illustrated by the example parameters in FIGS. 4-9.

Besides the differences, the examples in FIGS. 4-9 may also share some similarity. For instance, in some embodiments, the light folding elements in FIGS. 4-9 may include a prism (e.g., a parallelogram prism) (e.g., like light folding element 210 in FIG. 2). In some embodiments, an acute angle between two adjacent surfaces of the prism (e.g., the angle between the first surface S1 and third surface S3 of the prism as indicated in FIGS. 4-9) may be in a range between 25 and 35 degrees (e.g., 25≤prism angle≤35 degrees). In addition, in some embodiments, a ratio between the thickness of the prism and the total track length (TTL) of the light-folded projector may be in a range between 0.3 and 0.5 (e.g., 0.3≤prism thickness/TTL≤0.5). In some embodiments, absolute values of the optical power of group 1, group 2, and group 3 may have a relationship such that 0.2 (absolute value of optical power of group 1)/[(absolute value of optical power of group 2)+(absolute value of optical power of group 3)]≤0.6. In some embodiments, a ratio between the effective focal length (EFL) of the light-folded projector and thickness of the prism may be in a range between 2 and 4 (e.g., 2≤EFL of light-folded projector)/prism thickness 4). In some embodiments, a ratio between the effective focal length (EFL) of group 1 and length of the prism (e.g., measured in a direction approximately in parallel with the X-axis as indicated in FIG. 2A) may be in a range between 0.8 and 1.2 (e.g., 0.8≤(EFL of group 1)/prism length≤1.2). To further illustrate the difference and similarity, FIG. 10 provides a summary of some design parameters for the examples shown in FIGS. 2, and 4-9.

Figure 11:
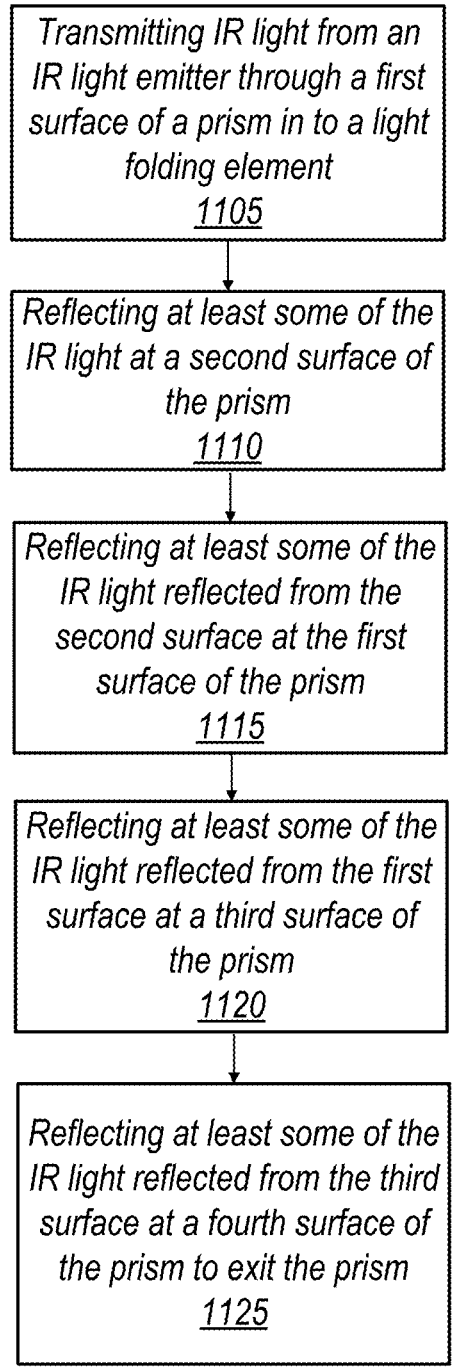
FIG. 11 is a high-level flowchart showing example techniques and methods for projecting IR light using a light folding element, according to some embodiments.

FIG. 11 is a high-level flowchart showing example techniques and methods for projecting IR light using a light folding element, according to some embodiments. For purposes of illustration, this example assumes that the light folding element includes a parallelogrammatic prism. As shown in FIG. 11, in some embodiments, IR light emitted from an IR light emitter of a light-folded projector may be transmitted through a first surface of a prism (e.g., like surface S1 in FIG. 2A) of a light folding element in to the light folding element, as indicated in block 1105. In some embodiments, the light-folded projector may further include one or more lenses optically in-between the IR light emitter and light folding element, such that the one or more lenses may pass through the IR light from the IR light emitter to (the first surface) of the light folding element. At least some of the IR light may be reflected at a second surface of the prism (e.g., like surface S2 in FIG. 2A), as indicated in block 1110. As described above, the reflection may occur when the incident angle of the IR light is close or greater than the critical angle at the second surface of the prism. At least some of the IR light reflected from the second surface may bounce back to the first surface and reflected again at the first surface of the prism, as indicated in block 1115. At least some of the IR light reflected from the first surface may travel to and be reflected at a third surface of the prism (e.g., like surface S3 in FIG. 2A), as indicated in block 1120. At least some of the IR light reflected from the third surface may reach a fourth surface of the prism (e.g., like surface S4 in FIG. 2), and get reflected at the fourth surface to exit the prism, as indicated in block 1125. As described above, in some embodiments, the light folding element may further include an optical power portion (e.g., portion 230 in FIG. 2A), wherein the IR light passing through the fourth surface may enter the optical power portion and then exit the light folding element from the optical power portion. Alternatively, in some embodiments, the light-folded projector may further include at least one separate lens positioned proximate the fourth surface of the prism, wherein the at least separate lens may pass through the IR light exiting from the light folding element to the environment.

Figure 12:
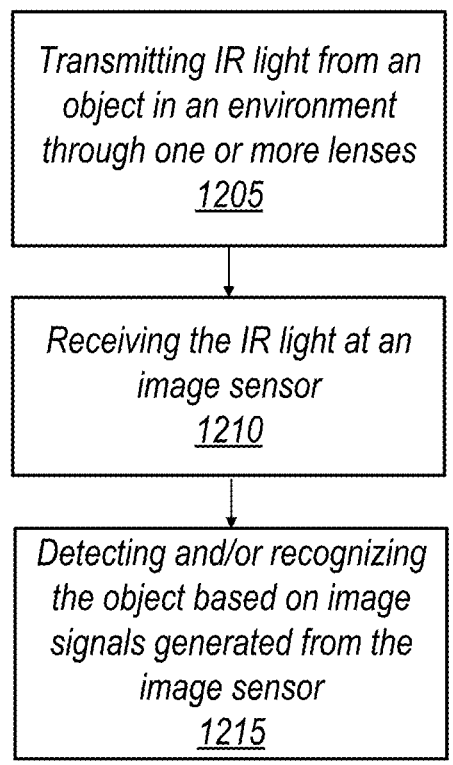
FIG. 12 is a high-level flowchart showing example techniques and methods for implementing object detection and/or recognition, according to some embodiments.

FIG. 12 is a high-level flowchart showing example techniques and methods for implementing object detection and/or recognition, according to some embodiments. As shown in FIG. 12, in some embodiments, IR light (that may be generated a light-folded projector) reflected from an object in an environment of the projector may be transmitted through one or more lenses of an IR detector, as indicated in block 1205. At least some of the IR light may pass through the lenses and be received at an image sensor of the IR detector, as indicated in block 1210. Imaging signals, e.g., electrical signals, generated from the image sensor based on the received IR light may be transmitted to a processor that may detect and/or recognize the object in the environment based, as indicated in block 1215. In some embodiments, the processor may create an image in order to accomplish the object detection and/or recognition.

Figure 13:
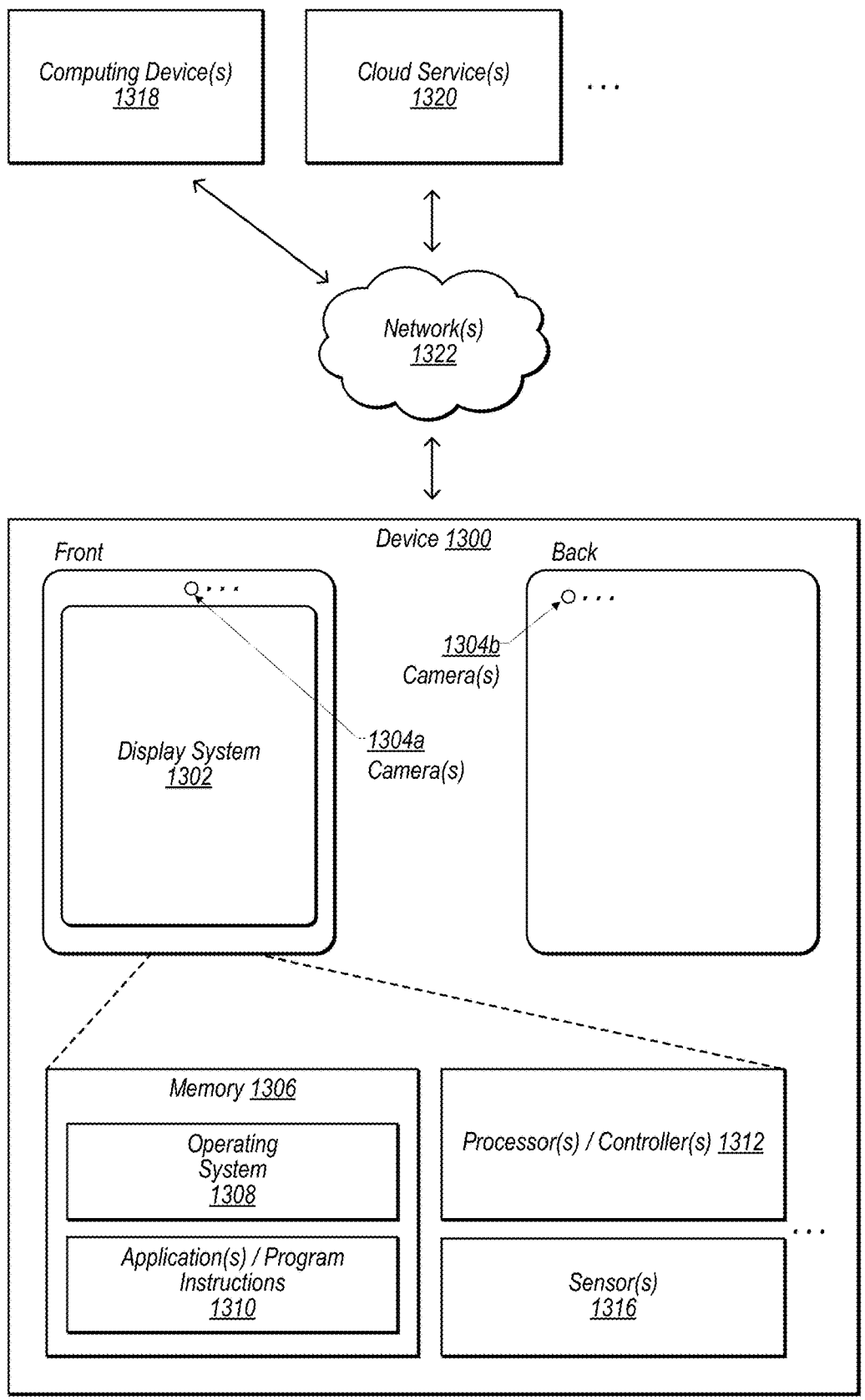
FIG. 13 illustrates a schematic representation of an example device that may include a light-folded projector, according to some embodiments.

FIG. 13 illustrates a schematic representation of an example device 1300 that may a light-folded projector, e.g., as described herein with reference to FIGS. 1-12 according to some embodiments. In some embodiments, the device 1300 may be a mobile device and/or a multifunction device. In various embodiments, the device 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1300 may include a display system 1302 (e.g., comprising a display and/or a touch-sensitive surface) and/or one or more cameras 1304. In some non-limiting embodiments, the display system 1302 and/or one or more front-facing cameras 1304a may be provided at a front side of the device 1300, e.g., as indicated in FIG. 13. Additionally, or alternatively, one or more rear-facing cameras 1304b may be provided at a rear side of the device 1300. In some embodiments comprising multiple cameras 1304, some or all of the cameras may be the same as, or similar to, each other. Additionally, or alternatively, some or all of the cameras may be different from each other. In various embodiments, the location(s) and/or arrangement(s) of the camera(s) 1304 may be different than those indicated in FIG. 13.

Among other things, the device 1300 may include memory 1306 (e.g., comprising an operating system 1308 and/or application(s)/program instructions 1310), one or more processors and/or controllers 1312 (e.g., comprising CPU(s), memory controller(s), display controller(s), and/or camera controller(s), etc.), and/or one or more sensors 1316 (e.g., orientation sensor(s), proximity sensor(s), and/or position sensor(s), etc.). In some embodiments, the device 1300 may communicate with one or more other devices and/or services, such as computing device(s) 1318, cloud service(s) 1320, etc., via one or more networks 1322. For example, the device 1300 may include a network interface (e.g., network interface 1410) that enables the device 1300 to transmit data to, and receive data from, the network(s) 1322. Additionally, or alternatively, the device 1300 may be capable of communicating with other devices via wireless communication using any of a variety of communications standards, protocols, and/or technologies.

Figure 14:
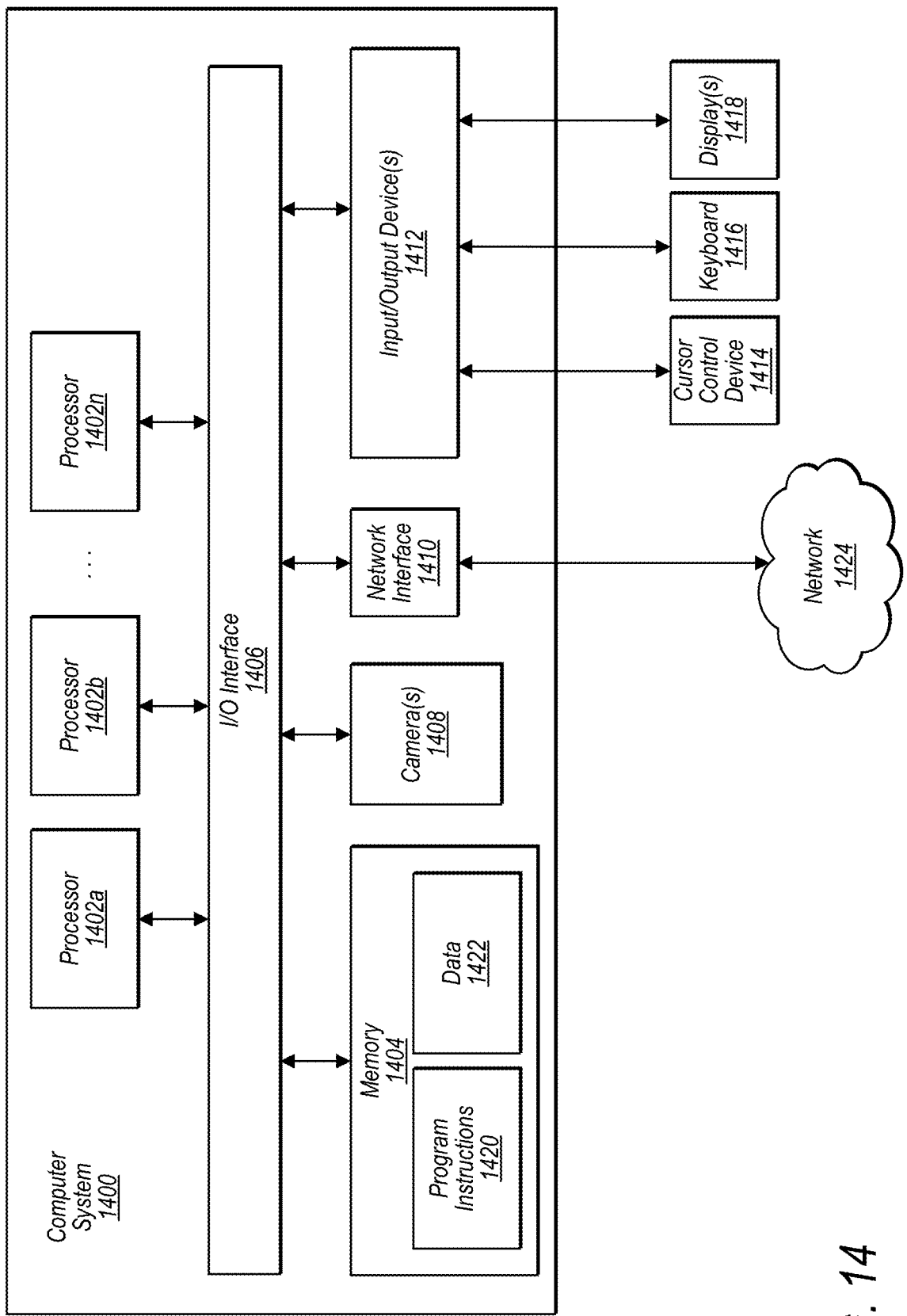
FIG. 14 illustrates a schematic block diagram of an example computer system that may include a light-folded projector, according to some embodiments.

FIG. 14 illustrates a schematic block diagram of an example computing device, referred to as computer system 1400, that may include or host embodiments of a device having a light-folded projector, e.g., as described herein with reference to FIGS. 1-13, according to some embodiments. In addition, computer system 1400 may implement methods for controlling operations of the camera and/or for performing image processing images captured with the camera. In some embodiments, the device 1300 (described herein with reference to FIG. 13) may additionally, or alternatively, include some or all of the functional components of the computer system 1400 described herein.

The computer system 1400 may be configured to execute any or all of the embodiments described above. In different embodiments, computer system 1400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1400 includes one or more processors 1402 coupled to a system memory 1404 via an input/output (I/O) interface 1406. Computer system 1400 further includes one or more cameras 1408 coupled to the I/O interface 1406. Computer system 1400 further includes a network interface 1410 coupled to I/O interface 1406, and one or more input/output devices 1412, such as cursor control device 1414, keyboard 1416, and display(s) 1418. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1402, or a multiprocessor system including several processors 1402 (e.g., two, four, eight, or another suitable number). Processors 1402 may be any suitable processor capable of executing instructions. For example, in various embodiments processors 1402 may be general-purpose or embedded processors implementing any of a variety of instruction set architectures (ISAs), such as the x86, PowerPC, SPARC, or MIPS ISAs, or any other suitable ISA. In multiprocessor systems, each of processors 1402 may commonly, but not necessarily, implement the same ISA.

System memory 1404 may be configured to store program instructions 1420 accessible by processor 1402. In various embodiments, system memory 1404 may be implemented using any suitable memory technology, such as static random access memory (SRAM), synchronous dynamic RAM (SDRAM), nonvolatile/Flash-type memory, or any other type of memory. Additionally, existing camera control data 1422 of memory 1404 may include any of the information or data structures described above. In some embodiments, program instructions 1420 and/or data 1422 may be received, sent or stored upon different types of computer-accessible media or on similar media separate from system memory 1404 or computer system 1400. In various embodiments, some or all of the functionality described herein may be implemented via such a computer system 1400.

In one embodiment, I/O interface 1406 may be configured to coordinate I/O traffic between processor 1402, system memory 1404, and any peripheral devices in the device, including network interface 1410 or other peripheral interfaces, such as input/output devices 1412. In some embodiments, I/O interface 1406 may perform any necessary protocol, timing or other data transformations to convert data signals from one component (e.g., system memory 1404) into a format suitable for use by another component (e.g., processor 1402). In some embodiments, I/O interface 1406 may include support for devices attached through various types of peripheral buses, such as a variant of the Peripheral Component Interconnect (PCI) bus standard or the Universal Serial Bus (USB) standard, for example. In some embodiments, the function of I/O interface 1406 may be split into two or more separate components, such as a north bridge and a south bridge, for example. Also, in some embodiments some or all of the functionality of I/O interface 1406, such as an interface to system memory 1404, may be incorporated directly into processor 1402.

Network interface 1410 may be configured to allow data to be exchanged between computer system 1400 and other devices attached to a network 1424 (e.g., carrier or agent devices) or between nodes of computer system 1400. Network 1424 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1410 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1412 may, in some embodiments, include one or more display terminals, keyboards, keypads, touchpads, scanning devices, voice or optical recognition devices, or any other devices suitable for entering or accessing data by one or more computer systems 1400. Multiple input/output devices 1412 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1410.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a camera; and
a projector comprising:
an infrared (IR) light emitter configured to emit IR light; and
a light folding element configured to receive the IR light and reflect the IR light one or more times to guide the IR light passing through the light folding element to an environment, wherein at least a portion of the light folding element is positioned between a portion of the camera and a cover glass of the device.

2. The device of claim 1, wherein the light folding element comprises a prism that is configured to:
transmit the IR light through a first surface of prism in to the prism;
reflect, at a second surface of the prism, at least some of the IR light passing through the first surface of the prism;
reflect, at the first surface of the prism, at least some of the IR light reflected from the second surface of the prism;
reflect, at a third surface of the prism, at least some of the IR light reflected from the first surface of the prism; and
reflect, at a fourth surface of the prism, at least some of the IR light reflected from the third surface of the prism to pass through the third surface out of the prism.

3. The device of claim 2, wherein the prism is a parallelogrammatic prism, and wherein an angle between the first surface and second surface of the prism is in a range between 25 and 35 degrees.

4. The device of claim 1, wherein the light folding element further comprises a portion attached to a surface of the light folding element facing the environment, and wherein the portion is configured to have optical power.

5. The device of claim 4, wherein the light folding element further comprises coating at the surface of the light folding element facing the environment, and wherein the coating is configured to increase at least one of the transmission or reflection of the IR light at the surface of the light folding element.

6. The device of claim 1, further comprising at least one lens that is positioned outside the light folding element and proximate a surface of the light folding element facing the environment.

7. The device of claim 1, further comprising one or more lenses positioned optically between the IR light emitter and the light folding element such that the one or more lenses pass through the IR light emitted from the IR light emitter to the light folding element.

8. The device of claim 7, wherein the one or more lenses include at least one wafer scale lens that includes one or more plastic portions attached to a glass substrate of the at least one wafer scale lens.

9. The device of claim 8, wherein the light folding element further comprises coating at a surface of the light folding element facing the one or more lenses, and wherein the coating is configured to increase at least one of the transmission or reflection of the IR light at the surface of the light folding element.

10. The device of claim 7, wherein the one or more lenses include at least one lens made of plastics.

11. The device of claim 1, further comprising a detector configured to detect or recognize an object in the environment using the IR light from the projector.

12. The device of claim 1, wherein the camera is positioned facing the environment to which the IR light is projected.

13. A device, comprising:
a camera;
a projector comprising:
an infrared (IR) light emitter configured to emit IR light; and
a light folding element configured to receive the IR light and reflect the IR light one or more times to guide the IR light passing through the light folding element to an environment, wherein at least a portion of the light folding element is positioned between a portion of the camera and a cover glass of the device; and
a detector configured to detect or recognize an object in the environment using the IR light from the projector.

14. The device of claim 13, wherein the light folding element comprises a prism that is configured to:
transmit the IR light through a first surface of prism in to the prism;
reflect, at a second surface of the prism, at least some of the IR light passing through the first surface of the prism;
reflect, at the first surface of the prism, at least some of the IR light reflected from the second surface of the prism;
reflect, at a third surface of the prism, at least some of the IR light reflected from the first surface of the prism; and
reflect, at a fourth surface of the prism, at least some of the IR light reflected from the third surface of the prism to pass through the third surface out of the prism.

15. The device of claim 13, wherein the light folding element further comprises a portion attached to a surface of the light folding element facing the environment, and wherein the portion is configured to have optical power.

16. The device of claim 15, wherein the light folding element further comprises coating at the surface of the light folding element facing the environment, and wherein the coating is configured to increase at least one of the transmission or reflection of the IR light at the surface of the light folding element.

17. The device of claim 13, further comprising at least one wafer scale lens that includes one or more plastic portions attached to a glass substrate of the at least one wafer scale lens.

18. The device of claim 17, wherein the light folding element further comprises coating at a surface of the light folding element facing the at least one wafer scale lens, and wherein the coating is configured to increase at least one of the transmission or reflection of the IR light at the surface of the light folding element.

19. The device of claim 13, wherein the camera is positioned facing the environment to which the IR light is projected.

20. A device, comprising:
a camera facing an environment in front of a device;
a projector comprising:
an infrared (IR) light emitter configured to emit IR light; and
a light folding element configured to receive the IR light and reflect the IR light one or more times to guide the IR light passing through the light folding element to project the IR light to the environment; and
a detector configured to detect or recognize an object in the environment using the IR light from the projector, wherein the IR light emitter is displaced from the camera and detector to at least partially overlap with the detector.

* * * * *